J. F. O'CONNOR.
FRICTION DRAFT RIGGING.
APPLICATION FILED JULY 31, 1911.
1,044,077.
Patented Nov. 12, 1912.
2 SHEETS—SHEET 1.
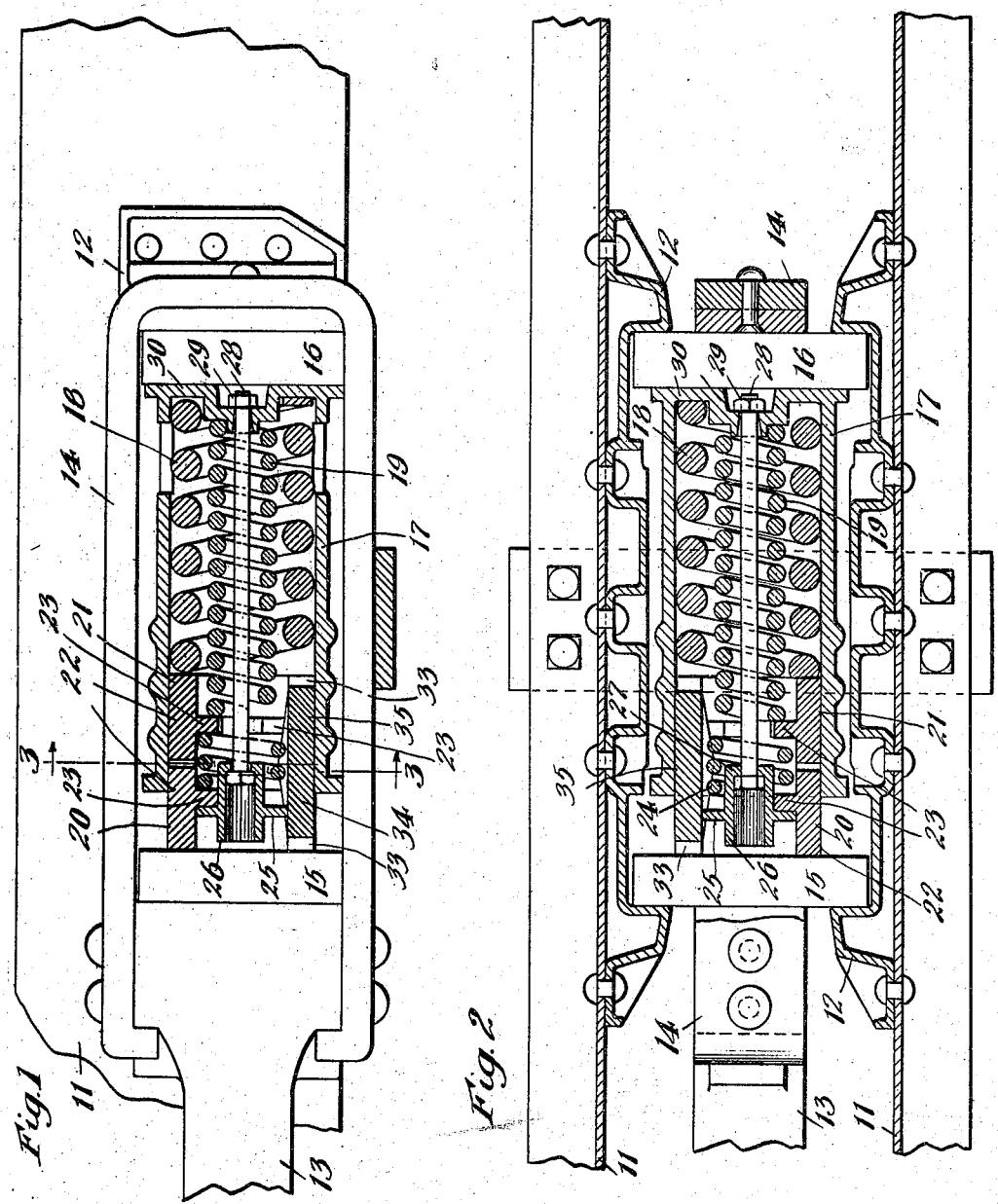
Witnesses:
Wm. Geiger
Pearl Abrams
Inventor:
John F. O'Connor
By Munday Evarts Adcock & Clarke
Attys.

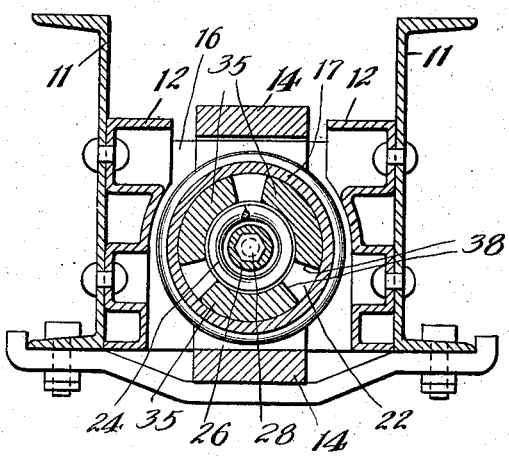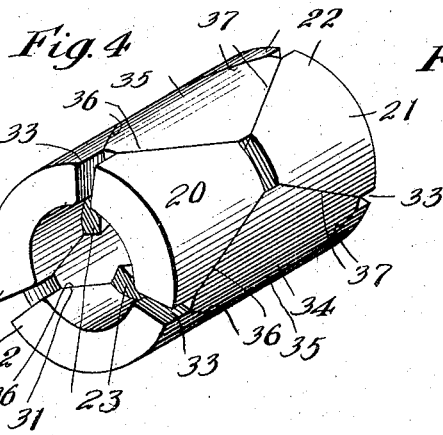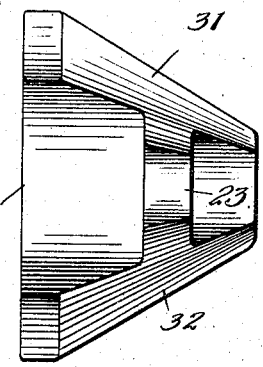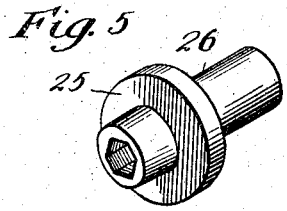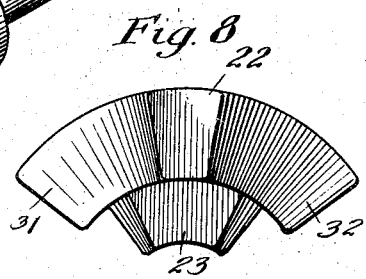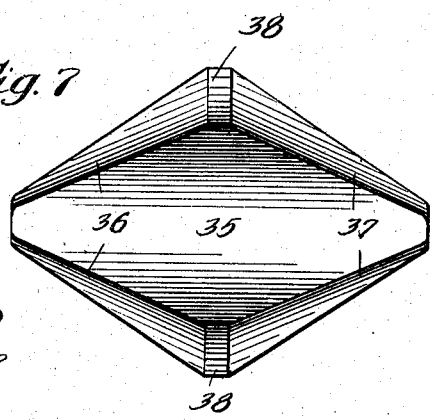

UNITED STATES PATENT OFFICE.

JOHN F. O'CONNOR, OF CHICAGO, ILLINOIS, ASSIGNOR TO WILLIAM H. MINER, OF CHICAGO, ILLINOIS.

FRICTION DRAFT-RIGGING.

1,044,077.  Specification of Letters Patent.  Patented Nov. 12, 1912.

Application filed July 31, 1911. Serial No. 641,406.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

My invention relates to an improvement in friction draft rigging for railway cars.

The object of my invention is to provide a friction draft rigging of a simple, efficient and strong construction, composed of few parts and capable of being cheaply manufactured, and more particularly in which the friction shoes may be made of relatively cheap material such as ordinary iron castings, and at the same time be free from danger of fracture or injury under unusually heavy shocks and blows.

My invention consists in the means employed and herein shown and described to practically accomplish this object, the same being more particularly pointed out in the claims.

In the accompanying drawings which form a part of this specification, Figure 1 is a side elevation, partly in central, vertical, longitudinal section, of a friction draft rigging embodying my invention. Fig. 2 is a plan view, partly in horizontal section, of the same. Fig. 3 is a vertical cross section on the line 3—3 of Fig. 1. Fig. 4 is a perspective view of the group of friction shoes assembled together, but without the other parts. Fig. 5 is a perspective view of the connecting thimble. Fig. 6 is a view detached, of one of the single wedge friction shoes. Fig. 7 is a similar view, of one of the double wedge friction shoes, and Fig. 8 is an end view of one of the wedge friction shoes.

In the drawing, 11 represents the center or draft sills of the car frame to which the stop members or castings 12 are secured; 13 the draw-bar; 14 the draft yoke; 15, 16, the front and rear followers; 17 a longitudinally movable friction shell arranged between the followers; 18, 19 springs longitudinally arranged within the friction shell; 20, 21, two sets of oppositely arranged annular segmental wedging friction shoes, each set preferably comprising three segmental wedging shoes 22, all preferably identical in shape and made from the same pattern. Intermediate between the two sets of friction shoes 20, 21, is a third set of friction shoes 34, each consisting of an annular, segmental friction shoe 35, all preferably made identical in shape or made from the same pattern, and each having the double wedging or four inclined faces 36, 36, 37, 37 and parallel clearance sides 38. The front and rear sets of shoes are each provided with annular, internal segmental ribs 23 to afford bearing for the small, short, segmental spring 24, which is interposed between the front set of shoes 20 and the rear set of shoes 21. The segmental ribs 23 on the front set of shoes also afford bearing for the flange 25 of the connecting thimble 26. The segmental internal ribs 23 of the rear set of shoes 21 afford a seat or bearing for the front end of the small spring 19 to react against, said small spring 19 being nested within the large spring 18, which re-acts at its front end against the rear set 21 of said segmental wedging friction shoes. The connecting thimble or bearing 26 is hollow and furnished with an internal flange 27 for the head of the connecting rod 28 to bear against. The connecting rod 28 is furnished with a threaded nut 29 at its rear end for engagement with the member 30 which closes the rear end of the friction shell 17, and which may, if preferred, be cast integral with the friction shell. The springs 18, 19, thus re-act at their rear end against the friction shell and at their front ends against the friction shoes, the larger spring against the rear set of friction shoes, and the smaller spring also against the rear set of friction shoes.

Each of the annular segmental friction shoes 22 has two inclined or wedging faces 31, 32, and a clearance space 33 is left between the friction shoes of each set at the larger or base ends of said shoes, to enable the shoes of each set to properly expand or spread apart under the wedging action presently to be explained. These three sets of annular, segmental wedging friction shoes 21, 22 and 34 are assembled together as indicated in Fig. 4, so that the wedging faces of the rear set of shoes bears upon the rear wedging faces of the intermediate set and the front wedging faces of said intermediate set bear against the wedging faces of the front set of shoes.

The front follower 15 bears against the front ends of the front set of friction shoes and the rear follower 16 against the rear end of the friction shell. As the annular segmental friction shoes of the front set interfit or internest circumferentially with the annular segmental friction shoes of the intermediate set, and as the wedge faces of the intermediate set act against the wedge faces of the rear set, the shoes are each and all subjected only to crushing strains. They are consequently adapted to be made of relatively cheaper and more fragile material, such as ordinary white iron castings, without liability of fracture, and which, being very hard, at the same time give very efficient and durable friction faces to the shoes for co-action with the internal cylindric friction face of the malleable iron friction shell 17. The shock absorbing action of the triple set of expansible annular wedging shoes is much more efficient than where only two sets of shoes are employed. Thus, the action of the rear set of shoes upon the intermediate shoes is multiplied by the latter in their action upon the front set of shoes, the friction thus being both graduated and multiplied by this compact arrangement of a triple set of interwedging faces.

The connecting thimble 26 and connecting rod 28 serve to hold all the parts in assembled position, and also to provide means for maintaining the springs under an initial compression and for automatically taking up any wear of the friction shell and shoes. Each of the wedge faces of each of the friction shoes of all three sets is preferably a spirally twisted wedge face instead of a straight or true plane. That is to say, each face is radial of the friction shell at all points of the length of the wedge face. This gives true and perfect contact between the wedge faces of adjacent shoes of all three sets throughout the length of the wedge faces. This will be readily understood from Figs. 3, 4, 6 and 7.

I claim:—

1. In a friction draft rigging, the combination with a draw-bar, draft yoke, stop members and followers, of a longitudinally movable friction shell, springs within the shell, one nested within the other, front and rear and intermediate sets of annular, segmental, wedging friction shoes, the shoes of the front and rear sets being furnished with internal shoulders, a supplemental spring interposed between the internal shoulders of the front and rear sets of shoes, a connecting thimble bearing against the shoulders of the front set of shoes and a connecting rod for said thimble and friction shell, substantially as specified.

2. In a friction draft rigging, the combination with a longitudinally movable friction shell, of a spring, two sets of oppositely arranged, annular, segmental, wedging friction shoes, and an intermediate double faced set of annular, segmental, wedging friction shoes, each of said shoes having a face in engagement with the friction shell, and the intermediate set of friction shoes being longitudinally movable relatively to the shell.

3. In a friction draft rigging, the combination with a longitudinally movable friction shell, of a spring, two sets of oppositely arranged annular, segmental wedging friction shoes arranged in line with each other longitudinally of the shell, and an intermediate double wedging set of annular, segmental friction shoes, said spring reacting at one end against the friction shell and at the other end against one set of said friction shoes, each of the friction shoes having its outer face in engagement with the inner face of the friction shell, substantially as specified.

4. In a friction draft rigging, the combination with a longitudinally movable friction shell, of a spring, two sets of oppositely arranged wedge friction shoes, an intermediate set of friction shoes coöperating with each of the first named sets of shoes, all of said sets of friction shoes being longitudinally movable in the shell, each of the friction shoes having its outer face in engagement with the inner face of the friction shell, substantially as described.

5. In a friction draft rigging, the combination with a longitudinally movable friction shell, of a spring, two sets of oppositely arranged annular, segmental wedging friction shoes, an intermediate set of double wedging friction shoes, said spring reacting at one end against the friction shell and at the other end against one set of friction shoes, and a supplemental spring reacting at one end against the front set of friction shoes and at the other end against the rear set of friction shoes, substantially as specified.

6. In a friction draft rigging, the combination with a longitudinally movable friction shell, of a spring, two sets of oppositely arranged wedge friction shoes, an intermediate set of friction shoes coöperating with each of the first named sets of shoes, all of said sets of friction shoes being longitudinally movable in the shell, and a spring located within said sets of oppositely arranged friction shoes and coöperating therewith.

7. In a friction draft rigging, the combination with a longitudinally movable friction shell, of a spring, two sets of oppositely arranged annular segmental wedging friction shoes, a third set of intermediate annular, double wedging friction shoes, and a connecting thimble and rod for holding said parts assembled, and the spring under an initial compression, substantially as specified.

JOHN F. O'CONNOR.

Witnesses:
PEARL ABRAMS,
EDW. S. EVARTS.